US009816684B2

(12) United States Patent
Asano et al.

(10) Patent No.: US 9,816,684 B2
(45) Date of Patent: Nov. 14, 2017

(54) LIGHT EMITTING DEVICE, CELL FOR LIGHT EMITTING DEVICE, AND METHOD FOR MANUFACTURING LIGHT EMITTING DEVICE (75) Inventors: Hideki Asano, Otsu (JP); Masanori Wada, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 57 days.

(21) Appl. No.: 13/822,643

(22) PCT Filed: Oct. 18, 2011

(86) PCT No.: PCT/JP2011/073934
§ 371 (c)(1),
(2), (4) Date: Mar. 13, 2013

(87) PCT Pub. No.: WO2012/098740
PCT Pub. Date: Jul. 26, 2012

(65) Prior Publication Data
US 2013/0294048 A1    Nov. 7, 2013

(30) Foreign Application Priority Data

Jan. 18, 2011   (JP) .................................. 2011-007975
Jun. 30, 2011   (JP) .................................. 2011-145984

(51) Int. Cl.
*F21V 9/16*   (2006.01)
*C09K 11/88*   (2006.01)
(Continued)

(52) U.S. Cl.
CPC .............. *F21V 9/16* (2013.01); *B32B 17/06* (2013.01); *C03C 27/10* (2013.01); *C09K 11/883* (2013.01);
(Continued)

(58) Field of Classification Search
CPC .......... F21K 9/56; F21Y 2101/02; F21V 9/16; G02B 26/008; G02F 1/133617;
(Continued)

(56) References Cited

U.S. PATENT DOCUMENTS 3,914,000 A * 10/1975 Beckerman et al. ........... 445/25
3,981,294 A *  9/1976 Deminet et al. ............... 126/633
(Continued)

FOREIGN PATENT DOCUMENTS

CN          1674317 A     9/2005
CN        101523625 A     9/2009
(Continued)

OTHER PUBLICATIONS

Official Communication issued in International Patent Application No. PCT/JP2011/073934, dated Jan. 17, 2012.
(Continued)

*Primary Examiner* — Elmito Breval
*Assistant Examiner* — Omar Rojas Cadima
(74) *Attorney, Agent, or Firm* — Keating and Bennett, LLP (57) ABSTRACT Provided are a long-life light emitting device less likely to degrade luminescence properties over time, a method for manufacturing the same, and a cell for a light emitting device used for the same. A light emitting device 1 includes a cell 10 and a luminescent material encapsulated in the cell 10. The cell 10 includes a pair of glass sheets 12 and 13 and a glass-made fused part 14*a*. The pair of glass sheets 12 and 13 are disposed to face each other with a space therebetween. The fused part 14*a* is disposed between respective peripheral portions of the pair of glass sheets 12 and 13. The fused part 14*a* is fused to each of the pair of glass sheets 12 and 13.

11 Claims, 4 Drawing Sheets (51) Int. Cl.
  *B32B 17/06* (2006.01)
  *C03C 27/10* (2006.01)
  *B82Y 20/00* (2011.01)
(52) U.S. Cl.
  CPC ............ *B82Y 20/00* (2013.01); *Y10S 977/774* (2013.01); *Y10S 977/95* (2013.01)
(58) Field of Classification Search
  CPC ........... G02F 1/33504; G02F 1/133514; G02F 1/133528; G02F 1/133553; G02F 1/133606; G02F 1/133609; G02F 1/133615; G03B 21/142
  USPC .......................................................... 362/84
  See application file for complete search history.

(56) References Cited

U.S. PATENT DOCUMENTS

| | | | |
|---|---|---|---|
| 4,050,786 A * | 9/1977 | Feldman | 349/155 |
| 4,400,870 A * | 8/1983 | Islam | H01L 21/50 |
| | | | 219/121.64 |
| 4,887,003 A | 12/1989 | Parker | |
| 4,956,577 A | 9/1990 | Parker | |
| 5,126,632 A * | 6/1992 | Parker | 313/634 |
| 5,198,723 A | 3/1993 | Parker | |
| 5,608,288 A * | 3/1997 | Haag | 313/612 |
| 6,762,072 B2 * | 7/2004 | Lutz | B81C 1/00269 |
| | | | 438/107 |
| 7,405,516 B1 * | 7/2008 | Wedding | C09K 11/06 |
| | | | 313/486 |
| 2002/0067121 A1 * | 6/2002 | Jean et al. | 313/485 |
| 2005/0186407 A1 | 8/2005 | Mori et al. | |
| 2005/0211991 A1 | 9/2005 | Mori et al. | |
| 2007/0273274 A1 * | 11/2007 | Horiuchi et al. | 313/504 |
| 2008/0110561 A1 * | 5/2008 | Lee | H01J 9/261 |
| | | | 156/275.3 |
| 2009/0004373 A1 | 1/2009 | Rath et al. | |
| 2009/0152567 A1 | 6/2009 | Comerford et al. | |
| 2009/0162011 A1 | 6/2009 | Coe-Sullivan et al. | |
| 2009/0278141 A1 | 11/2009 | Coe-Sullivan et al. | |
| 2009/0283778 A1 | 11/2009 | Coe-Sullivan et al. | |
| 2010/0038665 A1 | 2/2010 | Sugiura et al. | |
| 2010/0068468 A1 | 3/2010 | Coe-Sullivan et al. | |
| 2010/0103648 A1 | 4/2010 | Kim et al. | |
| 2010/0243053 A1 | 9/2010 | Coe-Sullivan et al. | |
| 2010/0259917 A1 | 10/2010 | Ramer et al. | |
| 2010/0265307 A1 | 10/2010 | Linton et al. | |
| 2010/0283014 A1 | 11/2010 | Breen et al. | |
| 2010/0283072 A1 | 11/2010 | Kazlas et al. | |
| 2010/0314646 A1 | 12/2010 | Breen et al. | |
| 2011/0012873 A1 * | 1/2011 | Prest et al. | 345/204 |
| 2011/0215721 A1 * | 9/2011 | Rains et al. | 315/51 |
| 2011/0233483 A1 | 9/2011 | Breen et al. | |
| 2011/0245533 A1 | 10/2011 | Breen et al. | |

FOREIGN PATENT DOCUMENTS

| | | |
|---|---|---|
| JP | 3080628 B2 | 8/2000 |
| JP | 2007-324337 A | 12/2007 |
| JP | 2010-126596 A | 6/2010 |
| JP | 2010-533976 A | 10/2010 |
| KR | 10-2010-0046698 A | 5/2010 |
| WO | 2010/003653 A2 | 1/2010 |

OTHER PUBLICATIONS

English translation of Official Communication issued in corresponding International Application PCT/JP2011/073934, dated Aug. 1, 2013.

* cited by examiner

LIGHT EMITTING DEVICE, CELL FOR LIGHT EMITTING DEVICE, AND METHOD FOR MANUFACTURING LIGHT EMITTING DEVICE

TECHNICAL FIELD

This invention relates to a light emitting device, a cell for a light emitting device used for the same, and a method for manufacturing a light emitting device. Particularly, this invention relates to a light emitting device in which luminescent material particles are encapsulated in an internal space of a cell, a cell for a light emitting device used for the same, and a method for manufacturing a light emitting device in which luminescent material particles are encapsulated in an internal space of a cell.

BACKGROUND ART

In recent years, a light emitting device using a luminescent material made of quantum dots has been proposed in, for example, Patent Literature 1 below. Specifically, Patent Literature 1 proposes a light emitting device (light sheet) in which a film or layer containing quantum dots is disposed on at least a portion of a surface of a waveguide. The light emitting device described in this Patent Literature 1 is a device for emitting, upon irradiation with excitation light, light having a different wavelength from the excitation light.

CITATION LIST

Patent Literature

Patent Literature 1: JP-A-2010-533976

SUMMARY OF INVENTION

Technical Problem

However, in the light emitting device described in Patent Literature 1, the luminescence properties thereof cannot be sufficiently prevented from degrading owing to contact between the luminescent material and oxygen and, thus, a problem of ease of time degradation in luminescence properties occurs.

The present invention has been made in view of the above point and an object thereof is to provide a long-life light emitting device less likely to degrade luminescence properties over time, a cell for a light emitting device used for the same, and a method for manufacturing the light emitting device.

Solution to Problem

A light emitting device according to the present invention includes a cell and a luminescent material encapsulated in the cell. The cell includes a pair of glass sheets and a glass-made fused part. The pair of glass sheets are disposed to face each other with a space therebetween. The fused part is disposed between respective peripheral portions of the pair of glass sheets. The fused part is fused to each of the pair of glass sheets.

The luminescent material is preferably formed of an inorganic phosphor. The inorganic phosphor is preferably made of quantum dots.

The light emitting device according to the present invention may further include a glass ribbon disposed between the pair of glass sheets, and the fused part may be formed of at least a portion of the glass ribbon.

Note that the term "glass ribbon" in the present invention means a strip-shaped glass member having a thickness of 1 mm or less. The glass ribbon may be linear or may have a bent or curved shape. The glass ribbon may be in the shape of a picture frame.

The glass ribbon preferably includes a portion unfused to the glass sheets.

The fused part may be formed by melting a bonding agent containing glass powder by heating.

The fused part may include a first portion formed of at least a portion of the glass ribbon disposed between the pair of glass sheets and a second portion formed by melting a bonding agent containing glass powder by heating. In this case, it is preferred that the number of the first portions included in the fused part be at least two, one of the at least two first portions be disposed at one ends of the glass sheets in one direction extending along surfaces of the glass sheets, and the other be disposed at the other ends of the glass sheets in the one direction.

The cell preferably has a through hole formed to communicate with a space in the cell. In this case, a glass-made sealing member is preferably provided which is disposed to close the through hole and fused to the cell.

The sealing member is preferably formed of a glass ribbon.

A cell for a light emitting device according to the present invention pertains to a cell used for a light emitting device including the cell and a luminescent material encapsulated in the cell. The cell for a light emitting device according to the present invention includes a pair of glass sheets and a glass-made fused part. The pair of glass sheets are disposed to face each other with a space therebetween. The fused part is disposed between respective peripheral portions of the pair of glass sheets. The fused part is fused to each of the pair of glass sheets.

A method for manufacturing a light emitting device according to the present invention pertains a method for manufacturing a light emitting device including a cell and a luminescent material encapsulated in the cell. In the method for manufacturing a light emitting device according to the present invention, respective peripheral portions of a pair of glass sheets disposed to face each other with a space therebetween are fused by using glass, thus producing the cell having an encapsulation hole. The luminescent material is encapsulated through the encapsulation hole into the cell.

The cell is preferably produced by placing a glass ribbon between the respective peripheral portions of the pair of glass sheets disposed to face each other with the space therebetween and fusing the glass ribbon to each of the pair of glass sheets.

A portion of the glass ribbon is preferably fused to each of the pair of glass sheets.

The cell may be produced by placing a glass ribbon and a bonding agent containing glass powder between the respective peripheral portions of the pair of glass sheets and fusing each of the glass ribbon and the bonding agent to each of the pair of glass sheets. In this case, it is preferred that at least two glass ribbons be placed between the respective peripheral portions of the pair of glass sheets, one of the at least two glass ribbons be placed at one ends of the pair of glass sheets in one direction extending along surfaces of the glass sheets, and the other be placed at the other ends of the pair of glass sheets in the one direction.

The method for manufacturing a light emitting device according to the present invention preferably further includes the step of placing a glass ribbon to cover the encapsulation hole in the cell containing the luminescent material encapsulated therein and then fusing the glass ribbon to the cell to close the encapsulation hole.

Advantageous Effects of Invention

The present invention can provide a long-life light emitting device less likely to degrade luminescence properties over time, a method for manufacturing the same, and a cell for a light emitting device used for the same.

DESCRIPTION OF EMBODIMENTS

Hereinafter, a description will be given of an exemplary preferred embodiment for working of the present invention. However, the following embodiment is simply illustrative. The present invention is not at all limited to embodiments below.

First Embodiment

Figure 1:
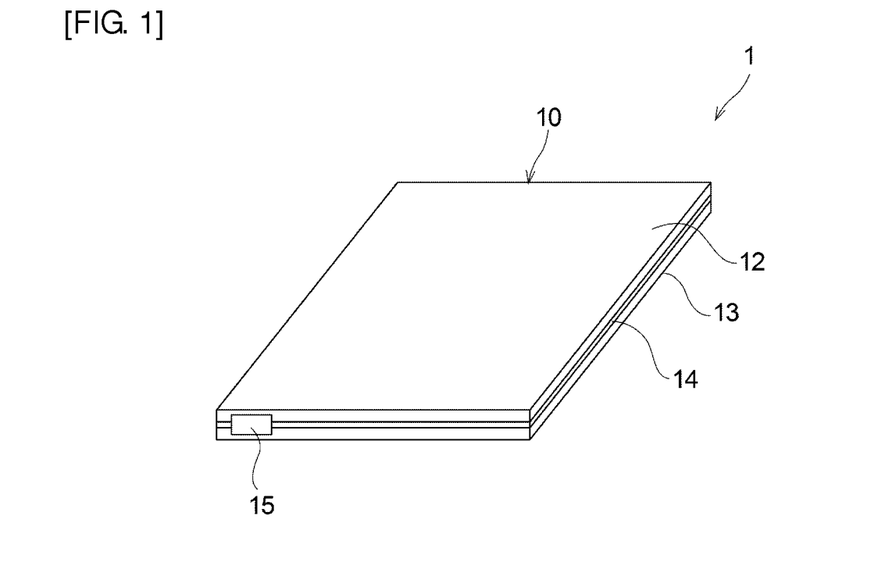
FIG. 1 is a schematic perspective view of alight emitting device according to a first embodiment.
Figure 2:
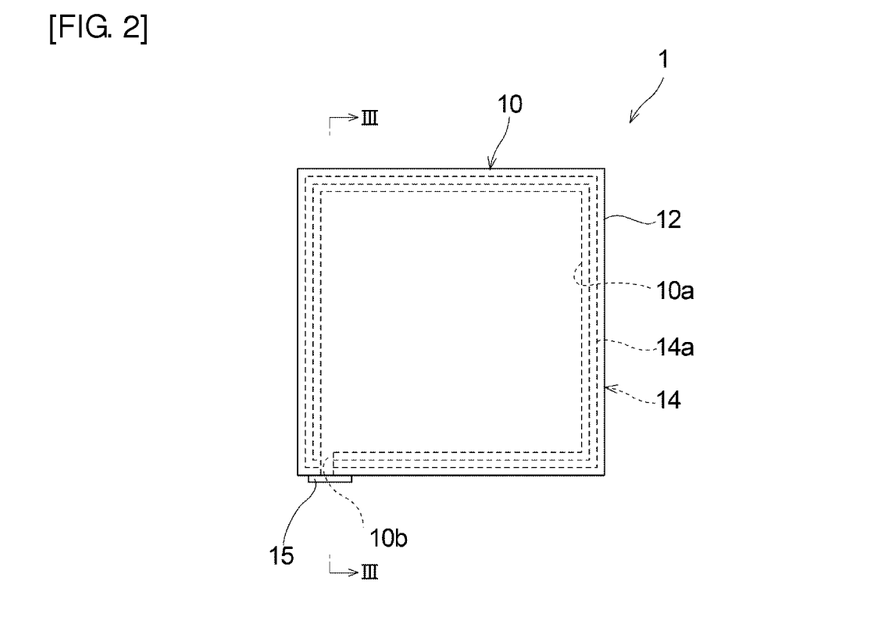
FIG. 2 is a schematic plan view of the light emitting device according to the first embodiment.
Figure 3:
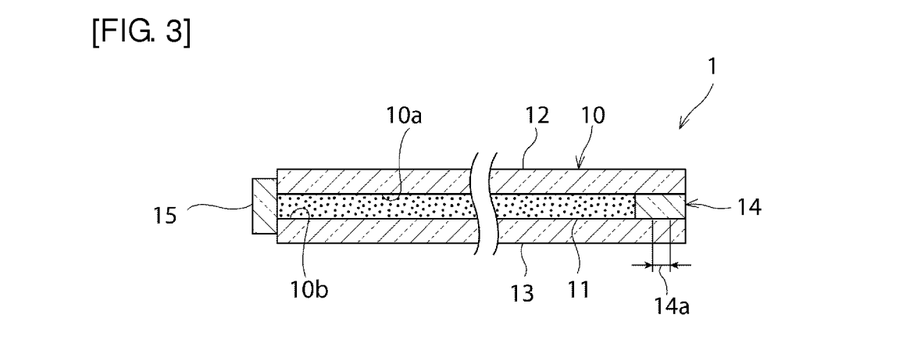
FIG. 3 is a schematic cross-sectional view taken along the line in FIG. 2.

FIG. 1 is a schematic perspective view of alight emitting device according to a first embodiment. FIG. 2 is a schematic plan view of the light emitting device according to the first embodiment. FIG. 3 is a schematic cross-sectional view taken along the line III-III in FIG. 2. First with reference to FIGS. 1 to 3, the structure of a light emitting device 1 according to this embodiment is described.

The light emitting device 1 is a device for emitting, upon incidence of excitation light, light having a different wavelength from the excitation light. The light emitting device 1 may be a device for emitting mixed light of excitation light and light produced by irradiation with the excitation light.

The light emitting device 1 includes a cell 10. The cell 10 has an internal space 10a. A luminescent material is encapsulated in the internal space 10a. Specifically, encapsulated in the internal space 10a is a light emitting part 11 in which a luminescent material is dispersed in a dispersion medium.

No particular limitation is placed on the type of the luminescent material. Examples of the luminescent material include phosphors, such as, for example, inorganic phosphors and organic phosphors. Of these, the preferred are inorganic phosphors.

Specific examples of the inorganic phosphor which produces a blue visible light (fluorescence having a wavelength of 440 to 480 nm) upon irradiation with an ultraviolet to near-ultraviolet excitation light having a wavelength of 300 to 440 nm include $Sr_5(PO_4)_3Cl:Eu^{2+}$ and $(Sr, Ba)MgAl_{10}O_{17}:Eu^{2+}$. Specific examples of the inorganic phosphor which produces a green fluorescence (fluorescence having a wavelength of 500 nm to 540 nm) upon irradiation with an ultraviolet to near-ultraviolet excitation light having a wavelength of 300 to 440 nm include $SrAl_2O_4:Eu^{2+}$ and $SrGa_2S_4:Eu^{2+}$. Specific examples of the inorganic phosphor which produces a green visible light (fluorescence having a wavelength of 500 nm to 540 nm) upon irradiation with a blue excitation light having a wavelength of 440 to 480 nm include $SrAl_2O_4:Eu^{2+}$ and $SrGa_2S_4:Eu^{2+}$. A specific example of the inorganic phosphor which produces a yellow visible light (fluorescence having a wavelength of 540 nm to 595 nm) upon irradiation with an ultraviolet to near-ultraviolet excitation light having a wavelength of 300 to 440 nm is $ZnS:Eu^{2+}$. A specific example of the inorganic phosphor which produces a yellow visible light (fluorescence having a wavelength of 540 nm to 595 nm) upon irradiation with a blue excitation light having a wavelength of 440 to 480 nm is $Y_3(Al,Gd)_5O_{12}:Ce^{2-}$. Specific examples of the inorganic phosphor which produces a red visible light (fluorescence having a wavelength of 600 nm to 700 nm) upon irradiation with an ultraviolet to near-ultraviolet excitation light having a wavelength of 300 to 440 nm include $Gd_3Ga_4O_{12}:Cr^{3-}$ and $CaGa_2S_4:Mn^{2+}$. Specific examples of the inorganic phosphor which produces a red visible light (fluorescence having a wavelength of 600 nm to 700 nm) upon irradiation with a blue excitation light having a wavelength of 440 to 480 nm include $Mg_2TiO_4:Mn^{4+}$ and $K_2SiF_6:Mn^{4+}$. The inorganic phosphors that can be used are those having a particle size of about 5 μm to about 50 μm.

Alternatively, the inorganic phosphor may be quantum dots. The quantum dot emits, upon incidence of excitation light, light having a different wavelength from the excitation light. The wavelength of light emitted from the quantum dot depends upon the particle size of the quantum dot. In other words, the wavelength of light obtained can be controlled by changing the particle size of the quantum dot. Therefore, the particle size of the quantum dot is selected to be a particle size meeting a desired wavelength of light. The quantum dot is generally less likely to be degraded by the contact with oxygen.

Examples of the quantum dot that can be used include those having a particle size of about 2 nm to about 10 nm. Specific examples of the quantum dot which produces a blue visible light (fluorescence having a wavelength of 440 to 480 nm) upon irradiation with an ultraviolet to near-ultraviolet excitation light having a wavelength of 300 to 440 nm include CdSe nanocrystals having a particle size of about 2.0 nm to about 3.0 nm. Specific examples of the quantum dot which produces a green visible light (fluorescence having a wavelength of 500 nm to 540 nm) upon irradiation with an ultraviolet to near-ultraviolet excitation light having a wavelength of 300 to 440 nm or a blue light having a wavelength of 440 to 480 nm include CdSe nanocrystals having a particle size of about 3.0 nm to about 3.3 nm. Specific examples of the quantum dot which produces a yellow visible light (fluorescence having a wavelength of 540 nm to 595 nm) upon irradiation with an ultraviolet to near-ultraviolet excitation light having a wavelength of 300 to 440 nm or a blue light having a wavelength of 440 to 480 nm include CdSe nanocrystals having a particle size of about 3.3 nm to about 4.5 nm. Specific examples of the quantum dot which produces a red visible light (fluorescence having a wavelength of 600 nm to 700 nm) upon irradiation with an ultraviolet to near-ultraviolet excitation light having a wavelength of 300 to 440 nm or a blue light having a wavelength of 440 to 480 nm include CdSe nanocrystals having a particle size of about 4.5 nm to about 10 nm.

A single type or a plurality of types of luminescent materials may be encapsulated in the internal space 10a depending upon the wavelength range of the excitation light and which color luminescence to be produced. For example, if a white light having superior color rendition is to be produced by irradiation with an ultraviolet to near-ultraviolet excitation light, respective luminescent materials capable of producing blue, green, and red visible lights by irradiation with the ultraviolet to near-ultraviolet excitation light can be used in combination. Alternatively, if a white light having superior color rendition is to be produced by irradiation with a blue excitation light, respective luminescent materials capable of producing green and red visible lights by irradiation with the blue excitation light can be used in combination.

No particular limitation is placed on the type of the dispersion medium so long as it can suitably disperse the luminescent material. The dispersion medium may be in liquid form or may be made of resin, glass or other materials.

The cell 10 includes a pair of glass sheets 12 and 13. The pair of glass sheets 12 and 13 are disposed to face each other with a space therebetween. The glass sheet 12 and the glass sheet 13 are parallel to each other. It is not always necessary that both the glass sheets 12 and 13 transmit both of luminescence and excitation light from the luminescent material. However, at least one of the glass sheets 12 and 13 needs to transmit luminescence from the luminescent material and at least one of them needs to transmit excitation light of the luminescent material. For example, the glass sheet 12 may transmit excitation light, whereas the glass sheet 13 may transmit luminescence.

The glass sheets 12 and 13 are preferably those having superior weatherability and less likely to react with the luminescent material and the dispersion medium. The glass sheets 12 and 13 can be made of, for example, silicate glass. The glass sheets 12 and 13 may be crystallized glass sheets.

No particular limitation is placed on the thickness of the glass sheets 12 and 13 but the thickness can be, for example, about 0.5 to about 2.0 mm.

A glass ribbon 14 is disposed between respective peripheral portions of the glass sheets 12 and 13. Specifically, the glass ribbon 14 is provided in the shape of a picture frame except for one point on the peripheral portions of the glass sheets 12 and 13.

In this embodiment, at least a portion of the glass ribbon 14 is fused to each of the glass sheets 12 and 13. This portion of the glass ribbon 14 fused to the glass sheets 12 and 13 constitutes a fused part 14a. In other words, in this embodiment, the fused part 14a is formed of a portion of the glass ribbon 14.

The fused part 14a is formed in the shape of a picture frame and the fused part 14a and the glass sheets 12 and 13 define the internal space 10a. The rest of the glass ribbon 14 other than the fused part 14a is not fused to the glass sheets 12 and 13 and has the function of a spacer. Thus, the glass ribbon 14 determines the thickness of the internal space 10a.

The materials for the glass ribbon 14 that can be used are glasses, including silicate glasses, borosilicate glasses, soda-lime glasses, alkali-free glasses, and crystallized glasses. Furthermore, it may be made of a glass of different type from that of the glass sheets 12 and 13 but is preferably made of a glass of the same type as that of the glass sheets 12 and 13. Thus, the glass sheets 12 and 13 can be equal in coefficient of thermal expansion to the glass ribbon 14. Therefore, the deformation of the cell 10 upon application of heat can be reduced.

The cell 10 has a through hole 10b formed to communicate with the internal space 10a. Specifically, the through hole 10b is formed in the fused part 14a. This through hole 10b is used for encapsulating the quantum dots into the internal space 10a. The through hole 10b is closed by a glass-made sealing member 15 fused to the cell 10. In this embodiment, the sealing member 15 is formed of a glass ribbon.

As described previously, in this embodiment, the internal space 10a containing a luminescent material encapsulated therein is defined by the glass sheets 12 and 13 and the glass-made fused part 14a. For this reason, the internal space 10a is surrounded by the glass members having high weatherability and low gas permeability. Therefore, degradation due to contact between the luminescent material encapsulated in the internal space 10a and oxygen is less likely to occur. Hence, in the case of using, as the luminescent material, particularly quantum dots less likely to cause degradation due to contact with oxygen, the luminescence properties of the light emitting device 1 of this embodiment become less likely to degrade over time and, therefore, the light emitting device 1 has a long life. In addition, in this embodiment, the sealing member 15 is also made of glass. Therefore, the contact between the luminescent material and oxygen can be more effectively prevented. Hence, the light emitting device can achieve a longer life.

Furthermore, since the cell 10 is made of glass and has high thermal resistance, the cell 10 is less likely to be deformed or degraded by heat from, for example, a light source, such as an LED, for emitting excitation light to the light emitting device 1.

Moreover, since the fused part 14a is formed of the glass ribbon 14, the thickness of the internal space 10a can be accurately controlled to a desired thickness. Therefore, thickness variations of the internal space 10a can be reduced to reduce in-plane variations in luminescence properties. Particularly in this embodiment, the glass ribbon 14 is partly not fused to the glass sheets 12 and 13. Therefore, thickness variations of the internal space 10a can be more effectively reduced to more effectively reduce in-plane variations in luminescence properties.

Next, a description is given of an example of a manufacturing method of the light emitting device 1 according to this embodiment. However, the following manufacturing method is simply illustrative and the manufacturing method of the light emitting device according to the present invention is not at all limited to the following manufacturing method.

Figure 4:
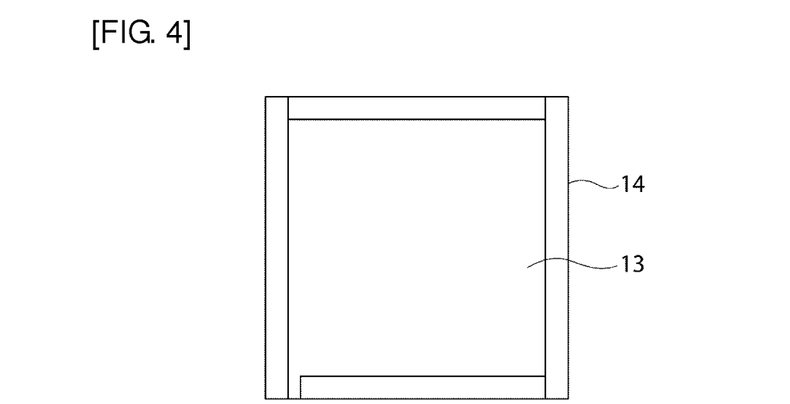
FIG. 4 is a schematic plan view for illustrating a step for manufacturing the light emitting device according to the first embodiment.
Figure 8:
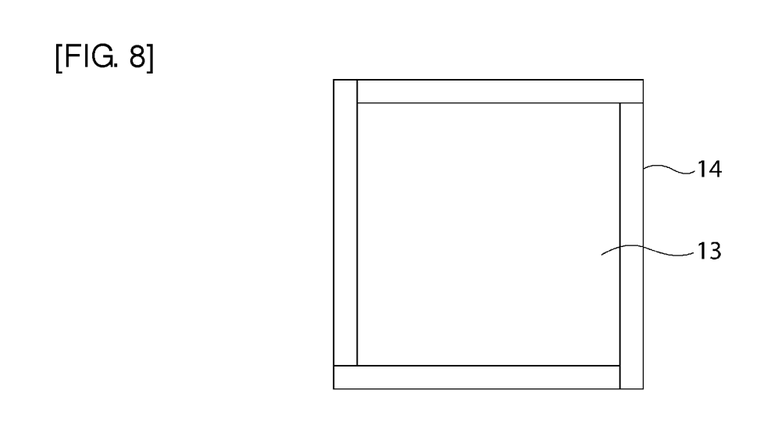
FIG. 8 is a schematic plan view for illustrating a step for manufacturing the light emitting device according to the first embodiment.

First, a glass sheet 13 is prepared. Next, as shown in FIG. 4, a glass ribbon 14 is placed on a peripheral portion of the glass sheet 13. Specifically, this embodiment describes an example in which four linear glass ribbons 14 are placed but, alternatively, two L-shaped glass ribbons may be placed or a single glass ribbon in the shape of a picture frame may be placed. As shown in FIG. 8, the glass sheet 13 may be square. In this case, the four glass ribbons 14 can be the same length. Thus, glass ribbons 14 of a single type only have to be prepared, which simplifies the manufacturing process of the cell 10. Note that in the example shown in FIG. 8 the length of each side of the glass sheet 13 is approximately equal to the sum of the length and width of the glass ribbon 14.

Next, the glass sheet 13 is laid on a glass sheet 12 with the glass ribbon(s) 14 between them. Thereafter, the glass ribbon 14 and at least one of the glass sheets 12 and 13 are heated by irradiating a portion to be formed into a fused part 14a with a laser, such as for example a $CO_2$ laser, causing a portion of the glass ribbon 14 to be fused to the glass sheets 12 and 13. Thus, a cell 10 is produced. In short, in this embodiment, a glass ribbon 14 is placed between respective peripheral portions of a pair of glass sheets 12 and 13 disposed to face each other with a space therebetween and only a portion of the glass ribbon 14 is fused to each of the glass sheets 12 and 13 to produce a cell 10.

Next, a luminescent material is encapsulated through the through hole 10b into the internal space 10a. Although no particular limitation is placed on the method for encapsulating the luminescent material, an example is a method of supplying, with the internal space 10a put in a pressure-reduced atmosphere, a liquid containing a luminescent material dispersed therein to the internal space 10a.

Finally, a sealing member 15 formed of a glass ribbon is placed to cover the through hole (encapsulation hole) 10b and irradiated with a laser to fuse the sealing member 15 to the cell 10, resulting in closure of the through hole 10b. Through the above steps, a light emitting device 1 can be manufactured.

By following the above manufacturing method of this embodiment, a light emitting device having a long life can be suitably manufactured.

Furthermore, since the fused part 14a is formed using a glass ribbon 14 with a small thickness, local heat application can be easily implemented, such as with a laser, so that a cell 10 made of glass can be easily manufactured. In addition, with the use of a glass ribbon 14, the residual strain of the cell 10 can be small.

Moreover, since only a portion of the glass ribbon 1 is fused to the glass sheets 12 and 13, the distance between the glass sheets 12 and 13 is held by the glass ribbon 14. Therefore, there is no need to provide, in the fusing step, another member for holding the distance between the glass sheets 12 and 13, so that the distance between the glass sheets 12 and 13 can be easily held constant.

Since, likewise, the sealing member 1 is formed using a glass ribbon, the sealing member 15 can also be easily formed. Furthermore, since the sealing member 15 can be formed by local heat application with a laser, the thermal degradation of the luminescent material in the internal space 10a can be reduced in the step of forming the sealing member 15. Therefore, a light emitting device 1 having a high luminous efficiency can be manufactured.

Hereinafter, a description will be given of another exemplary preferred embodiment for working of the present invention. In the following description, elements having substantially the same functions as those in the first embodiment are referred to by the common references and further explanation thereof will be omitted.

Second Embodiment

Figure 5:
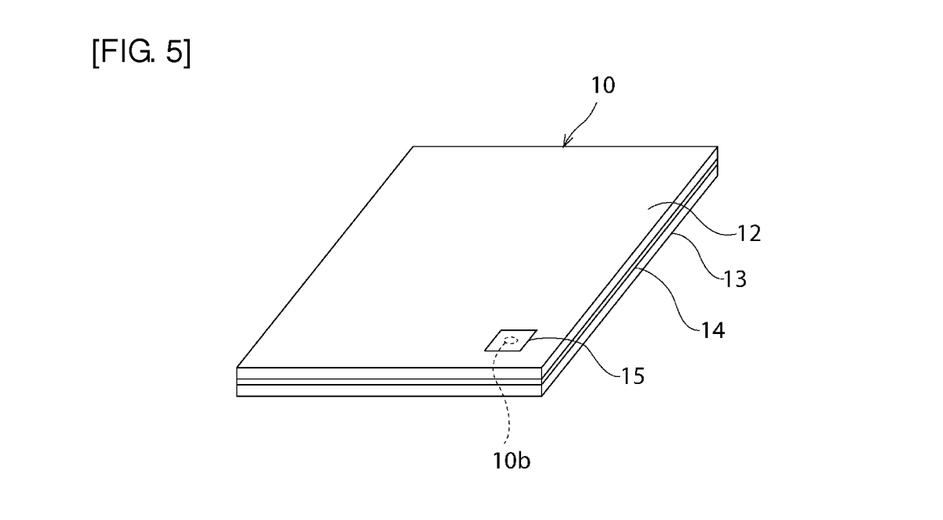
FIG. 5 is a schematic perspective view of a light emitting device according to a second embodiment.
Figure 6:
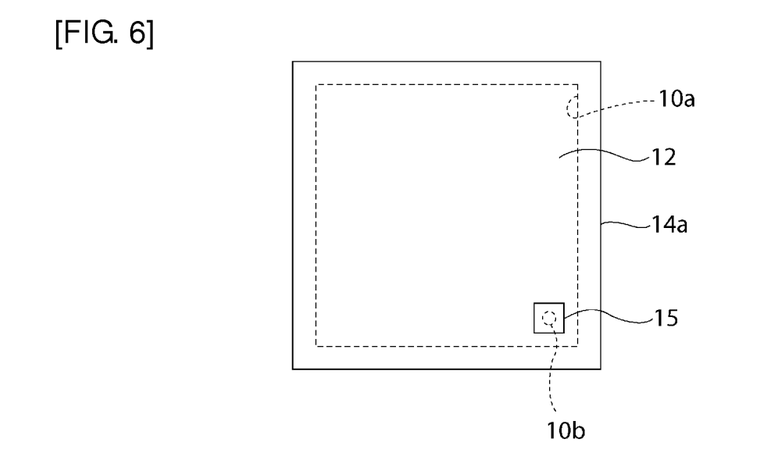
FIG. 6 is a schematic plan view of the light emitting device according to the second embodiment.

FIG. 5 is a schematic perspective view of alight emitting device according to a second embodiment. FIG. 6 is a schematic plan view of the light emitting device according to the second embodiment.

The first embodiment above has described an example in which the fused part 14a is formed of the glass ribbon 14 placed between the glass sheets 12 and 13. In contrast, in this embodiment, the fused part 14a is formed by melting a bonding agent containing glass powder by heating.

Figure 7:
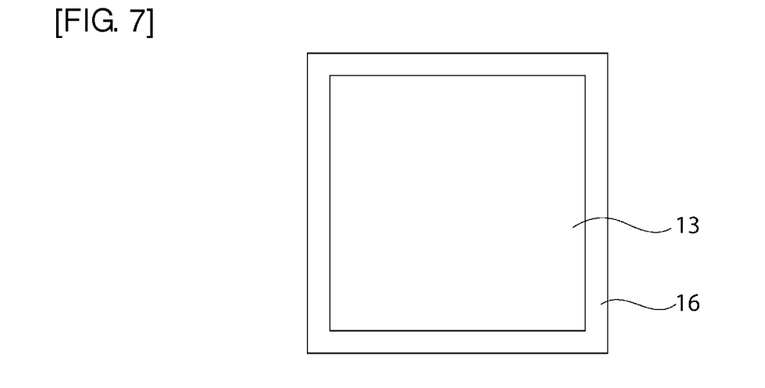
FIG. 7 is a schematic plan view for illustrating a step for manufacturing the light emitting device according to the second embodiment.

In manufacturing the light emitting device of this embodiment, instead of placing a glass ribbon 14 on a glass sheet 13, a bonding agent 16 is placed on it as shown in FIG. 7. In the case of a bonding agent 16 in paste form, the bonding agent 16 is placed by application. Thereafter, a glass sheet 12 is laid on the glass sheet 13 and the bonding agent 16 is heated, such as using a laser, to soften it, resulting in the formation of a fused part 14a.

Examples of the glass powder contained in the bonding agent 16 include, for example, glass powders of tin phosphate glasses and glass powders of bismuth-based glasses. The glass powder may contain a light-absorbing material. The bonding agent 16 may contain ceramic powder. Examples of the ceramic powder contained in the bonding agent 16 include, for example, ceramic powders of alumina, titania and zirconia. The bonding agent 16 may contain, instead of or in addition to glass powder or ceramic powder, for example, carbon.

In the case where a bonding agent 16 containing glass powder is used to place it on a peripheral portion of the glass sheet 13 and form a fused part 14a, the provision of a through hole 10b in the inner surface of the glass sheet 12 enables the luminescent material to be supplied to the internal space 10a of the cell 10.

Third Embodiment

Figure 9:
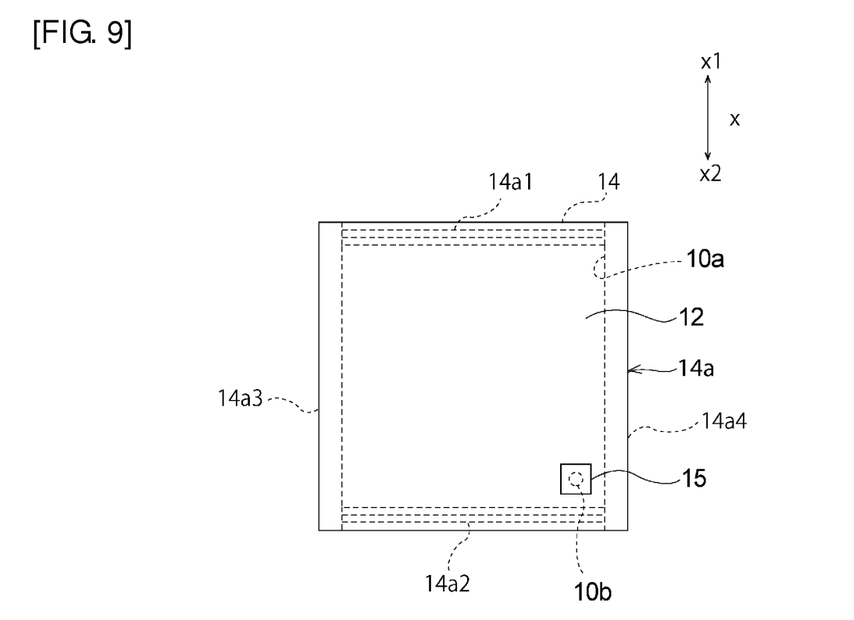
FIG. 9 is a schematic plan view of a light emitting device according to a third embodiment.

FIG. 9 is a schematic plan view of alight emitting device according to a third embodiment.

The first embodiment above has described an example in which the fused part 14a is formed of the glass ribbon 14 placed between the glass sheets 12 and 13. The second embodiment above has described an example in which the fused part 14a is formed by melting a bonding agent 16 containing glass powder by heating.

Unlike the above embodiments, in this embodiment, the fused part 14a includes: two first portions 14a1 and 14a2 each formed of at least a portion of a glass ribbon 14; and two second portions 14a3 and 14a4 each formed by melting a bonding agent 16 containing glass powder by heating.

The first portion 14a1 is disposed at an x1-side end of the glass sheet 12 in one direction x extending along the surface of the glass sheet 12. On the other hand, the first portion 14a2 is disposed at an x2-side end of the glass sheet 12 in the direction x. Therefore, the thickness of the internal space 10a can be accurately controlled to a desired thickness. Hence, a light emitting device having a desired luminescence intensity can be obtained. Furthermore, thickness variations of the internal space 10a can be reduced to reduce in-plane variations in luminescence intensity. From the viewpoint of reducing variations, the first portion 14a1 and the first portion 14a2 should preferably be opposed to each other.

Figure 10:
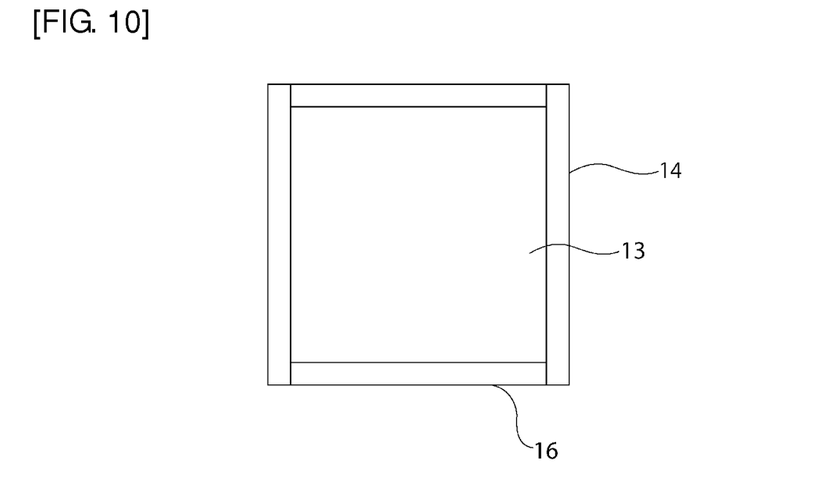
FIG. 10 is a schematic plan view for illustrating a step for manufacturing the light emitting device according to the third embodiment.

The light emitting device of this embodiment can be manufactured, for example, in the following manner. First, as shown in FIG. 10, glass ribbons 14 and a bonding agent 16 are placed on a glass sheet 13. Thereafter, a glass sheet 12 is laid on the glass sheet 13 with the glass ribbons 14 and the bonding agent 16 between them. Next, at least portions of the glass ribbons 14 and the bonding agent 16 are heated, such as using a laser, to soften them, causing each of the glass ribbons 14 and the bonding agent 16 to be fused to the glass sheets 12 and 13. Thus, a fused part 14a is formed.

The third embodiment has described an example in which the fused part 14a includes the two first portions 14a1 and 14a2 and the two second portions 14a3 and 14a4. However, the present invention is not limited to this configuration. The fused part may include a single first portion and a single second portion or may include three or more first portions and/or three or more second portions.

Furthermore, in the case where the fused part includes the two first portions, the first portions do not always have to be opposed to each other.

REFERENCE SIGNS LIST

1 . . . light emitting device
10 . . . cell
10a . . . internal space
10b . . . through hole
11 . . . light emitting part
12, 13 . . . glass sheet
14 . . . glass ribbon
14a . . . fused part
15 . . . sealing member
16 . . . bonding agent

The invention claimed is:

1. A light emitting device comprising a cell and a luminescent material encapsulated in the cell,
wherein the cell comprises: a pair of glass sheets disposed to face each other with a space therebetween; a glass-made fused part disposed between respective peripheral portions of the pair of glass sheets and fused to each of the pair of glass sheets; and a strip-shaped glass ribbon disposed between the pair of glass sheets, wherein
the glass-made fused part is defined by a portion of the glass ribbon such that the glass ribbon includes a fused portion, a first unfused portion, and a second unfused portion;
the fused portion is fused to the pair of glass sheets;
the first unfused portion and the second unfused portion are made of the glass ribbon and are not fused to the pair of glass sheets;
the fused portion is located between the first unfused portion and the second unfused portion; and
the fused portion, the first unfused portion, and the second unfused portion are in direct contact with the pair of glass sheets.

2. The light emitting device according to claim 1, wherein the luminescent material is formed of an inorganic phosphor.

3. The light emitting device according to claim 2, wherein the inorganic phosphor is made of quantum dots.

4. The light emitting device according to claim 1, wherein the cell has a through hole formed to communicate with a space in the cell, and
the light emitting device further comprises a glass-made sealing member disposed to close the through hole and fused to the cell.

5. The light emitting device according to claim 4, wherein the sealing member is formed of a glass ribbon.

6. A cell for a light emitting device, being used for a light emitting device comprising the cell and a luminescent material encapsulated in the cell, the cell comprising:
a pair of glass sheets disposed to face each other with a space therebetween;
a glass-made fused part disposed between respective peripheral portions of the pair of glass sheets and fused to each of the pair of glass sheets; and
a strip-shaped glass ribbon disposed between the pair of glass sheets, wherein
the glass-made fused part is defined by a portion of the glass ribbon such that the glass ribbon includes a fused portion, a first unfused portion, and a second unfused portion;
the fused portion is fused to the pair of glass sheets;
the first unfused portion and the second unfused portion are made of the glass ribbon and are not fused to the pair of glass sheets;
the fused portion is located between the first unfused portion and the second unfused portion; and
the fused portion, the first unfused portion, and the second unfused portion are in direct contact with the pair of glass sheets.

7. A method for manufacturing a light emitting device comprising a cell and a luminescent material encapsulated in the cell, the method comprising the steps of:
placing a strip-shaped glass ribbon between respective peripheral portions of a pair of glass sheets disposed to face each other with a space therebetween and fusing the glass ribbon to each of the pair of glass sheets to form a glass-made fused part so that the glass ribbon includes a fused portion, a first unfused portion, and a second unfused portion, the fused portion is fused to the pair of glass sheets, the first unfused portion and the second unfused portion are made of the glass ribbon and are not fused to the pair of glass sheets, and the fused portion is located between the first unfused portion and the second unfused portion, thus producing the cell having an encapsulation hole; and
encapsulating the luminescent material through the encapsulation hole into the cell,
wherein the fused portion, the first unfused portion, and the second unfused portion are in direct contact with the pair of glass sheets.

8. The method for manufacturing a light emitting device according to claim 7, wherein the luminescent material is formed of an inorganic phosphor.

9. The method for manufacturing a light emitting device according to claim 8, wherein the luminescent material is made of quantum dots.

10. The method for manufacturing a light emitting device according to claim 7, wherein at least two glass ribbons are placed between the respective peripheral portions of the pair of glass sheets, one of the at least two glass ribbons is placed at one ends of the pair of glass sheets in one direction extending along surfaces of the glass sheets, and the other is placed at the other ends of the pair of glass sheets in the one direction.

11. The method for manufacturing a light emitting device according to claim 7, the method further comprising the step of placing a glass-made sealing member to cover the encapsulation hole in the cell containing the luminescent material encapsulated therein and then fusing the glass-made sealing member to the cell to close the encapsulation hole.

* * * * *